(No Model.) 2 Sheets—Sheet 1.
F. R. ESTLOW.
MOTOR MECHANISM FOR CARS.
No. 361,354. Patented Apr. 19, 1887.
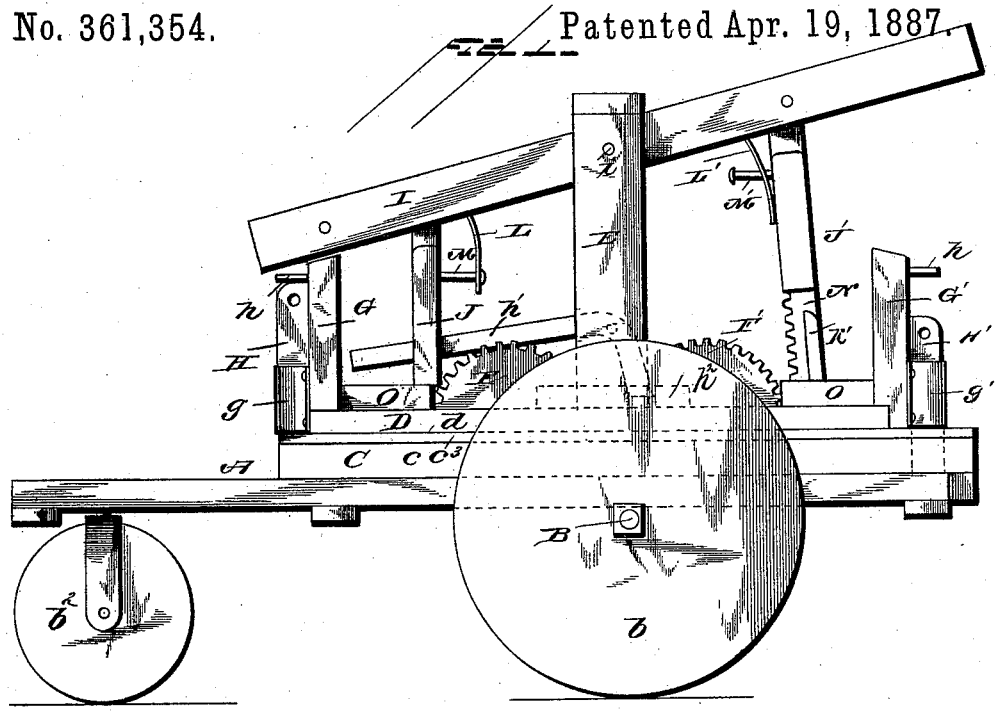
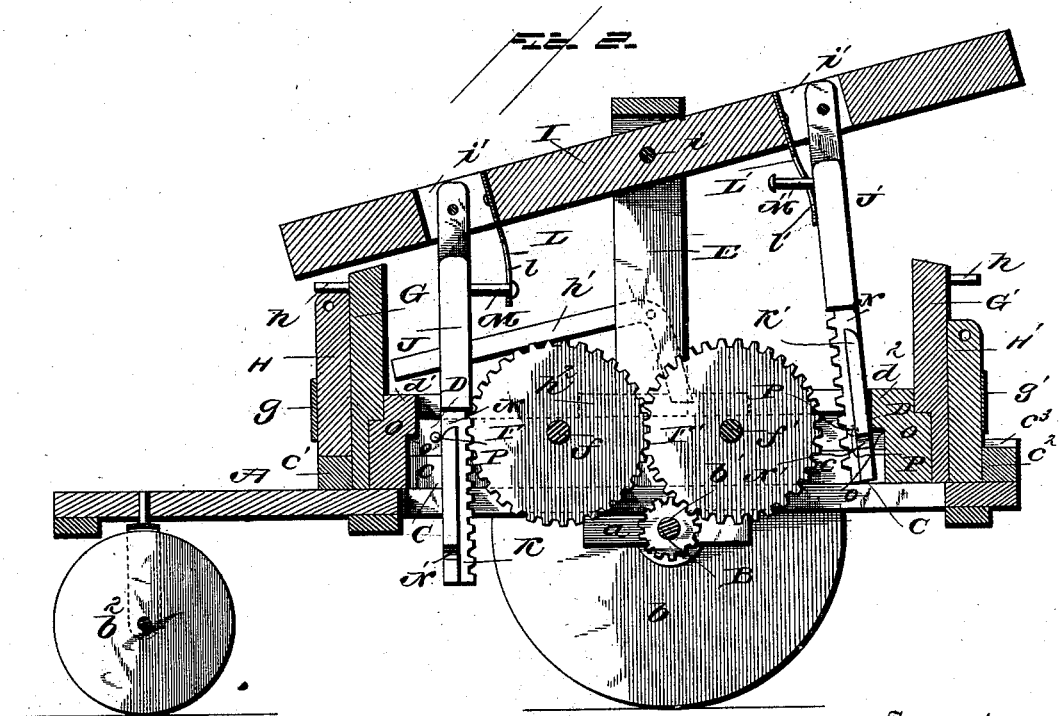
Witnesses
Inventor
F. R. Estlow,
By his Attorneys

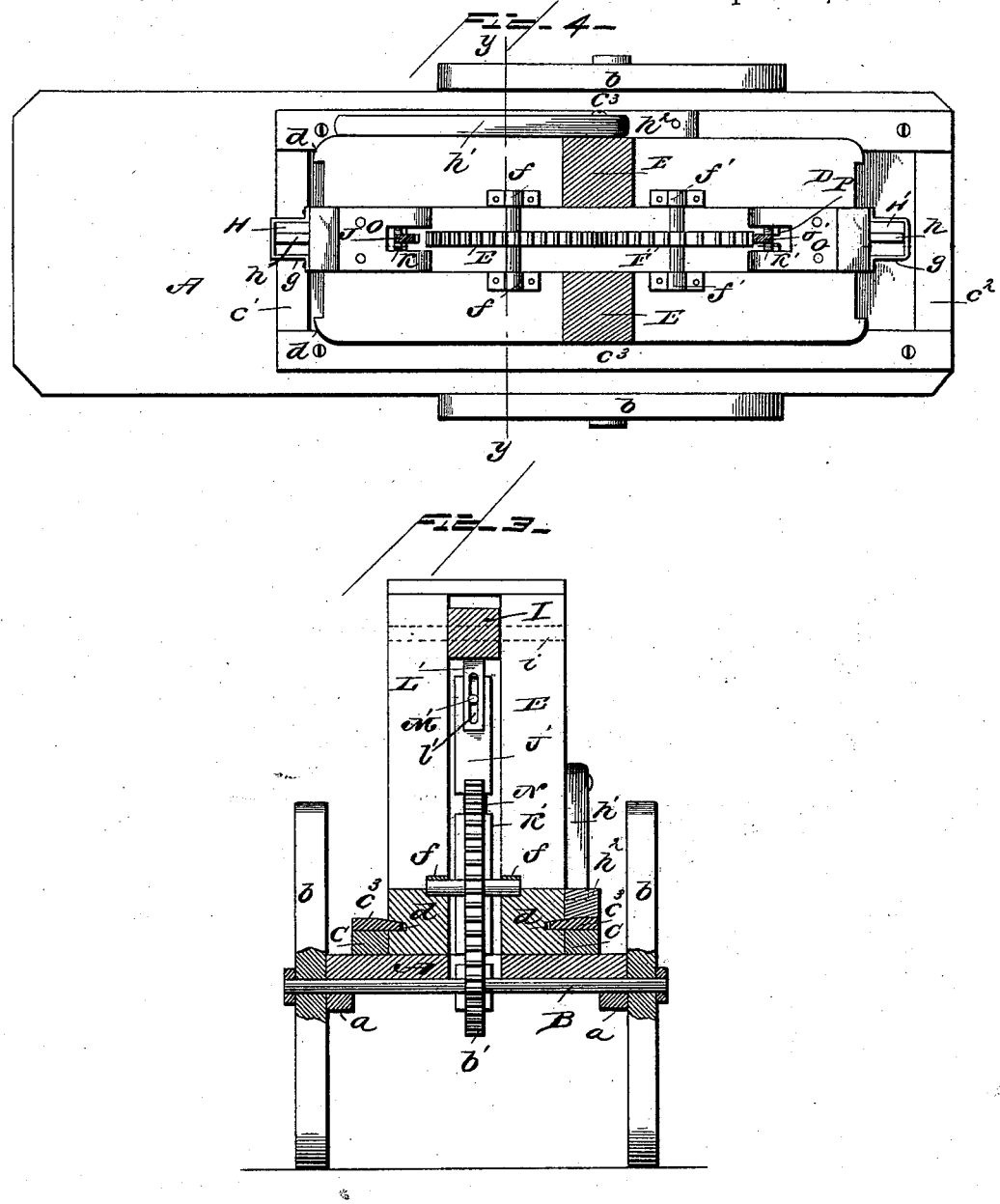

UNITED STATES PATENT OFFICE.

FRANCIS ROBNO ESTLOW, OF BARNEGAT, NEW JERSEY.

MOTOR MECHANISM FOR CARS.

SPECIFICATION forming part of Letters Patent No. 361,354, dated April 19, 1887.

Application filed December 31, 1886. Serial No. 223,091. (No model.)

*To all whom it may concern:*

Be it known that I, FRANCIS ROBNO ESTLOW, a citizen of the United States, residing at Barnegat, in the county of Ocean and State of New Jersey, have invented a new and useful Improvement in Motor Mechanisms, of which the following is a specification, reference being had to the accompanying drawings.

This invention relates to improvements in motor mechanisms, particularly in that class in which manual power is used to actuate a hand-car or other light machine.

The main object of the invention is to provide simple, effective, and inexpensive means whereby the main shaft of the machine can be rotated continuously and uniformly in either direction and can have the direction of its rotation quickly and readily reversed.

The invention consists, mainly, in causing two vertically-reciprocating rack-bars having their upward extensions pivoted, respectively, upon the opposite arms of a centrally-pivoted lever to engage and disengage two similar meshing gear-wheels in such manner that the said wheels will rotate in one direction a third gear-wheel secured upon the main shaft of the machine.

It consists, also, in the means whereby either of the equal-sized meshing gear-wheels can be quickly and readily engaged with or disengaged from the gear-wheel on the main shaft, the action that engages one to the said gear-wheel disengaging the other.

The invention further consists in certain details of construction and arrangement hereinafter described, illustrated in the drawings, and pointed out in the claims appended.

In the annexed drawings, Figure 1 is a side elevation of a hand-car embodying my improvements. Fig. 2 is a central vertical longitudinal section of the same. Fig. 3 is a plan view of the device with the operating-lever removed, and Fig. 4 is a transverse sectional view taken on the line $y\ y$ of Fig. 3.

Referring to the accompanying drawings, A designates the platform of a car of general rectangular shape, and having secured to its under surface, about centrally, the bearing-blocks $a\ a$, in which the main shaft B is journaled, the said shaft having at its ends the wheels $b$ and centrally upon it the gear-wheel $b'$. If the car is intended to travel over turn- pikes or ordinary roads, a third wheel, $b^2$, is journaled in a bracket swiveled to and depending from the platform. This wheel serves as a steering-wheel, and is guided by suitable mechanism under the control of the operator, and all the wheels are unflanged.

If the car is intended to move over a tramway it must be provided with two sets of flanged wheels.

Upon the upper surface of the platform A is secured a rectangular frame, C, having the longitudinal or side rails, $c\ c$, and the transverse end rails, $c'\ c^2$, respectively.

The side rails have secured upon their upper edges the inwardly-extending strips $c^3 c^3$, which serve as guides in the grooves $d$ in the side rails of the movable frame-work D. The said frame-work is movable longitudinally within the frame C, and is composed of the grooved side rails, the end rails, $d'\ d^2$, and the similar standards E E, which rise centrally from the side rails, and are united at top by a cross-bar, as shown.

F F' are intermeshing gear-wheels, the shafts of which are journaled in proper bearings, $f f'$, on each side of the standards and equally distant therefrom. The said gear-wheels F F' are each adapted to mesh with the gear-wheel $b'$ on the main shaft; but both cannot engage at the same time. The means by which one is thrown into engagement therewith and the other disengaged therefrom is as follows:

G G' are standards rising centrally from the ends of the frame-work D, and having respectively secured to their outward sides the vertical bracket-casings $g\ g'$, as shown.

H H' are detent-blocks, which respectively enter and are movable up and down in the casings $g\ g'$.

Upon raising the block H and sliding the frame-work D in the direction of said block, the block H' falls between the standard G' and the adjacent inner surface of the end rail, $c^2$, of the frame C, and the gear-wheel F' is moved into engagement with the gear-wheel $b'$, while the gear-wheel F is disengaged therefrom. By reversing the process, the wheel F is engaged and the wheel F' disengaged.

$h\ h$ are pins or screws, which act as stops to prevent the blocks H H' from being drawn out of position.

The frame-work, and consequently the gear-wheels, are moved back and forth by means of the rectangularly-bent lever $h'$, pivoted at an angle upon one of the standards E, and with the end of its vertical or downwardly-extending arm inserted in a recess or notch in a block, $h^2$, secured to the side rail of the frame C.

I is a lever pivoted centrally upon a bar, $i$, which extends between the standards E, near their upper ends. Each arm of the said lever is of the same length, and each has, at an equal distance from the pivot-bar $i$, a vertical slot, $i'$, in which the upper ends of the swinging bars J J' are pivoted. To the lower ends of the said bars are respectively secured the vertical rack-bars K K', the former of which meshes with the gear-wheel F and the latter with the gear-wheel F'.

L L' are leaf-springs standing downward from the arms of the lever I, adjacent to and to the inner side of the bars J J', from which stand inward the headed pins or rods M M', and pass through the longitudinal slots $l\ l'$ in the said springs.

The rack-bars K K' are provided near their tops with the opposite notches N N, and their bottoms with the similar notches, N' N', the notches being on the opposite sides of the bars and extending to but not into the rack-teeth.

O O are blocks forming part of the framework D, and standing inward from the lower ends of the standards G G'. The inner ends of the blocks are vertically notched, as at $o\ o$, for the passage of the rack-bars when the latter are being reciprocated, and the said notches have standing inward from their opposite sides the pins P P, of suitable length to pass easily through the notches N and N'.

Now, suppose that the frame-work D is moved, as described, so as to cause the gear-wheel F to mesh with the gear $b'$ on the main shaft. The rack-bar K meshes with the gear-wheel F only when it moves upward, as at the lowest point of its descent. The spring L, pressing against the head of the pin M, moves the rack-bar K into engagement, the notches N being then opposite the pins P and passing over the same. The pins P then press against the outer surface of the rack-bar and keep it in engagement till it reaches its highest point. The pins P are then opposite the notches N', and the rack-bar is pushed outward by the action of the spring L on the bar J, the pins P passing through the notches N' and resting on the inner surface of the rack-bar, so as to keep it out of engagement in its descent; but while the rack-bar K is descending the rack-bar K' is ascending, and, meshing with the gear-wheel F', rotates the wheel F, which consequently rotates the gear $b'$ continuously and uniformly in the same direction, thereby rotating the axle or main shaft of the machine.

By moving the frame-work D in the manner described, so as to engage the gear F' with the gear $b'$ and disengage the gear F therefrom, the motion of the car is reversed, as the gears F and F' rotate in opposite directions.

It will be readily understood that my motor can be used for other purposes than driving hand-cars, and that the power need not necessarily be applied to the lever I. For instance, by applying a weight and rope to the shaft B the machine will automatically operate a pump, the lever I being connected to the piston-rod of the pump.

Having thus described my invention, I claim—

1. In a motor mechanism, the combination of the lever pivoted centrally upon vertical standards, the rack-bars depending and swinging from the arms of the said lever, the intermeshing gear-wheels respectively engaging with said rack-bars when the latter move upward and disengaging from the same when moving downward, the gear-wheel on the axle or main shaft of the machine arranged to engage with either of the said gear-wheels while disengaged from its fellow, and mechanism, substantially as described, whereby the reciprocating rack-bars are thrown into engagement with the adjacent gear-wheels when beginning to ascend and out of engagement when beginning to descend, substantially as specified.

2. In a motor mechanism, the combination of the gear-wheel secured to the main shaft, the frame-work movable longitudinally on the platform of the machine, the intermeshing gear-wheels journaled on said platform in such manner that the movement of the same in one direction will engage one of its attached gear-wheels with the gear-wheel on the main shaft and disengage the other attached gear-wheel therefrom, the lever pivoted centrally upon standards rising from the said frame-work, and the rack-bars depending and swinging from the arms of said lever and each arranged to engage the adjacent gear-wheel attached to the movable frame-work when ascending and to disengage from the same when descending, substantially as specified.

3. In a motor mechanism, the combination, with the main shaft or axle, the gear-wheel secured thereon, the frame-work movable longitudinally on the platform of the machine, and the similar intermeshing gear-wheels having their shafts journaled on the frame-work and adapted to alternately engage with the gear-wheel on the main shaft, of the lever pivoted centrally upon standards rising from the frame-work midway between the attached gear-wheels, the rack-bars engaging during their ascent the adjacent gear-wheels, the bars having the rack-bars secured to their lower ends and their upper ends pivoted in slots in the arms of the lever, the headed rods or pins standing from said bars, and the slotted springs secured to the arms of the lever and arranged to engage the corresponding racks when ascending with the adjacent gear-wheels and disengage them therefrom when descending, substantially as specified.

4. In the herein-described machine, the combination of the platform A, the frame C, secured thereon, the frame-work D, movable in said frame and provided with the standards G G', and the detent-blocks H H', moving in the casings $g\ g'$, secured to the standards G G', and the gear-wheel secured upon the axle or main shaft B, and the gear-wheels F F', journaled upon the frame-work D, substantially as specified.

5. In the herein-described machine, the combination of the platform A, the frame C, secured thereto, the frame-work adapted to move longitudinally in said frame and provided with the end standards, G G', the detent-blocks H H', moving in the casings $g\ g'$, respectively, the right-angled lever $h'$, pivoted on a standard rising from the frame-work, and the recessed block $h^2$, secured to the frame C, with the main shaft or axle, the gear-wheel secured thereto, and the two intermeshing gear-wheels with their shafts journaled on the movable frame-work, substantially as specified.

6. In the herein-described machine, the combination, with the gear-wheel on the main shaft, the movable frame-work, and the intermeshing gear-wheels journaled thereon, all substantially as described, of the centrally-pivoted lever provided with slots in its arms, the bars pivoted in said slots, the headed pins standing inward from said bars, the slotted springs secured to the arms of the lever with the said rods or pins passing through their slots, and the rack-bars provided with the sets of side notches, N and N', substantially as specified.

In testimony that I claim the foregoing as my own I have hereto affixed my signature in presence of two witnesses.

FRANCIS ROBNO ESTLOW.

Witnesses:
   CHAS. B. BROWN,
   AUGUSTUS M. COX.